INVENTORS.
EMIL TORICK &
RICHARD G. ALLEN
BY
Brumbaugh, Free, Graves & Donohue
their ATTORNEYS.

INVENTORS.
EMIL TORICK &
RICHARD G. ALLEN
BY
Brumbaugh, Free, Graves & Donohue
their ATTORNEYS.

United States Patent Office 3,529,244
Patented Sept. 15, 1970

3,529,244

METHOD AND APPARATUS FOR FREQUENCY SENSITIVE AMPLITUDE LIMITING

Emil Torick, Darien, Conn., and Richard G. Allen, Pound Ridge, N.Y., assignors to Columbia Broadcasting System, Inc., New York, N.Y., a corporation of New York Filed Mar. 13, 1967, Ser. No. 622,518
Int. Cl. H04b *1/04, 1/62*
U.S. Cl. 325—147 7 Claims

ABSTRACT OF THE DISCLOSURE

A technique and apparatus for signal limiting in a system where the permissible maximum signal amplitude characteristic is not constant with frequency. The signal is modified in an equalization network in accordance with the inverse of the output characteristic and by means of filters and separate automatic gain control circuits, different frequency ranges are maintained at levels corresponding to the output characteristic. Short duration peaks are clipped and the signal then restored, by a complementary equalization network, to its original spectral response. In an F.M. transmitting system, the first equalization network has a conventional preemphasis characteristic and the second provides complementary deemphasis. Upon application to the transmitter preemphasis network, the resultant signal levels are such that substantially 100% modulation is obtained and overmodulation avoided.

The present invention relates to methods and means for signal limiting, and more particularly, to techniques and apparatus for signal limiting in systems where the maximum permissible signal amplitude is different for different frequencies.

It is often required that electronic signals undergo a transformation such that their peak amplitudes are limited to a predetermined maximum level. The maximum level allowable depends upon the particular application involved. In broadcasting for example, the amplitude of audio signals must be limited so as not to cause over 100% modulation of the transmitter carrier. In the case of amplitude modulation broadcasting, 100% modulation is achieved when the instantaneous peak amplitude of the modulated carrier is equal to twice the unmodulated carrier wave amplitude. In frequency modulation broadcasting, the amplitude of the modulating signals should be such as to produce a frequency deviation of the carrier of 75 kc., which is the 100% modulation figure established by the Federal Communications Commission. Another area in which peak amplitude limiting is required is in the disc recording field. In the case of grooved records, the spacing between adjacent grooves and restrictions based on velocity and acceleration of the record and playback stylii, respectively, impose strict limitations on the swing of the cutting stylus and peak control of the signal to be recorded must be effected.

A complication arises when it is required that components of a complex signal within a particular frequency range be limited to a different level than are other frequency components of the complex signal. In frequency modulation broadcasting, and in some disc, magnetic tape and optical recording systems, this type of frequency sensitive limiting is desirable.

In frequency modulation broadcasting, audio signals undergo what is known as preemphasis prior to modulation, That is, high frequency components of the audio signals are emphasized relative to the low frequency components, for the purpose of increasing the high frequency signal to noise ratio at the receiver. If all of the frequency components of the audio signal are peak amplitude limited to the same level prior to preemphasis, preemphasis renders the amplitude level of the transmitted high frequency components substantially greater than that of the low and mid frequency components of the audio signal. Since efficient broadcast practice requires that the average percentage modulation of the carrier wave be maintained as near 100% as possible, while at the same time, overmodulation must be avoided, this technique creates a problem in that, if the amplitude level of the high frequency components is sufficiently low so that 100% modulation of the carrier wave is not exceeded, the substantially lower amplitude level of the low frequency components causes the average modulation to fall excessively below 100%.

To avoid this problem, frequency sensitive limiting may be employed. If, prior to preemphasis, the high frequency components of the audio signal are peak amplitude limited to a level lower than that to which low- and mid-frequency components of the audio signal are limited, the maximum peak amplitude of all frequency components may be equalized as the signal undergoes preemphasis. Thus, the modulating signal has no substantial amplitude level differential between ranges of frequency components, and the level may be adjusted for close to 100% modulation throughout the transmission of all signal frequency components. Similarly, a frequency sensitive peak amplitude limiter is sometimes desirable for disc recording because preemphasis is often used to increase the high frequency signal to noise ratio in order to minimize record groove noises during play back.

In order to understand the problems involved in designing satisfactory frequency sensitive peak amplitude limiters for broadcasting and recording purposes, it is advantageous to mention properties of certain conventional amplitude limiting circuits and how such properties are utilized to minimize audible distortion. One type of such circuit, called a clipper or clipping circuit, is a simple diode circuit which does not pass signals having a peak amplitude above a desired maximum, thereby restricting the peak amplitude of the output signal. Prior approaches to solution of the problem solved by the present inventors have employed such clipping circuits but have been unsatisfactory because of the amount of signal distortion introduced.

Another type of conventional limiter, hereinafter called an automatic gain control limiter, comprises a variable gain amplifier through which the signal passes, and feedback means coupling the amplifier output to the gain control circuitry in the amplifier. The coupling is arranged so that an increase in the amplifier input signal amplitude results in a decrease in amplifier gain, thereby limiting the amplitude of the signal at the output of the amplifier.

In most applications where conventional peak amplitude limiters are utilized, distortion becomes a problem if the signal limited has a peak of a comparatively long duration. To this distortion in broadcasting and recording systems an automatic gain control limiter with an amplifier gain recovery time significantly greater than the period of a single cycle of the signal limited is often utilized. For example, under certain circumstances, the recovery time should coincide approximately with the syllabic rate of speech (e.g. 100 milliseconds). As discussed in copending patent application Ser. No. 441,464, filed Mar. 22, 1965, for "Automatic Peak Signal Controller" and assigned to the present assignee, the relatively long recovery time of such a peak amplitude limiter would unduly reduce gain in the face of a peak of a relatively short duration. To avoid such an undesirable gain reduction, the invention of the aforementioned application provides a significantly improved form of limiter comprised of limiting circuits of both the automatic gain control and clipping types.

The foregoing types of limiting circuits basically are not frequency sensitive and while effective in amplitude modulation systems, are of lesser advantage in applications where frequency dependent overloading can occur, such as frequency modulation transmission and disc recording.

Accordingly, the primary object of the present invention is to provide an improved signal limiting method and apparatus for systems in which the desired maximum output characteristic is not constant with frequency.

It is another object of the present invention to provide a novel frequency sensitive amplitude limiter capable of limiting components of a signal within different frequency ranges to widely different maximum amplitudes without thereby introducing significant distortion.

It is a further object of the present invention to provide an improved frequency sensitive amplitude limiter wherein the levels to which components of a signal are limited may be easily changed.

Still another object of the present invention is to provide an improved frequency sensitive amplitude limiter wherein the frequency ranges which it distinguishes between may be easily changed.

Yet another object of the present invention is to provide a frequency sensitive peak amplitude limiting method and apparatus capable of insuring substantially 100% modulation over the entire audio frequency range in a frequency modulation system, while at the same time avoiding any overmodulation.

A further object of the invention is to provide a novel form of high frequency filter arrangement for use in such limiters.

Briefly, the present invention achieves the foregoing objectives by subjecting the signal to equalization in a network having a characteristic which is the inverse of the desired output characteristic, automatically controlling the gain of a signal amplifier to maintain maximum amplitude levels, and then subjecting the signal to complementary equalization. The signal is then in proper form for application to the utilization circuit so that the signal variations induced by the utilization circuit do not result in signal amplitudes exceeding the prescribed maximums.

In the adaptation of the invention for F.M. broadcasting, the low frequency components of the signal are limited by a first automatic gain control limiter, and the high frequency components of the signal are limited by a second automatic gain control limiter. At a point prior to the high frequency limiting action, the signal is subjected to equalization in a circuit having the normal preemphasis characteristic. After limiting, the signal passes through a de-emphasis network whose characteristic is complementary to that of the preemphasis network. The circuit thus, in effect, anticipates the transfer characteristic of the F.M. transmitter preemphasis and so controls the amplitude of the signals that when subjected to such preemphasis of the transmitter, modulation over the entire frequency range will stay close to 100% and frequency deviation beyond the permissible maximum will be avoided.

The foregoing and other objects, features and advantages of the present invention will become more readily apparent from the following detailed description thereof when taken in conjunction with the accompanying drawings in which.

Figure 1:
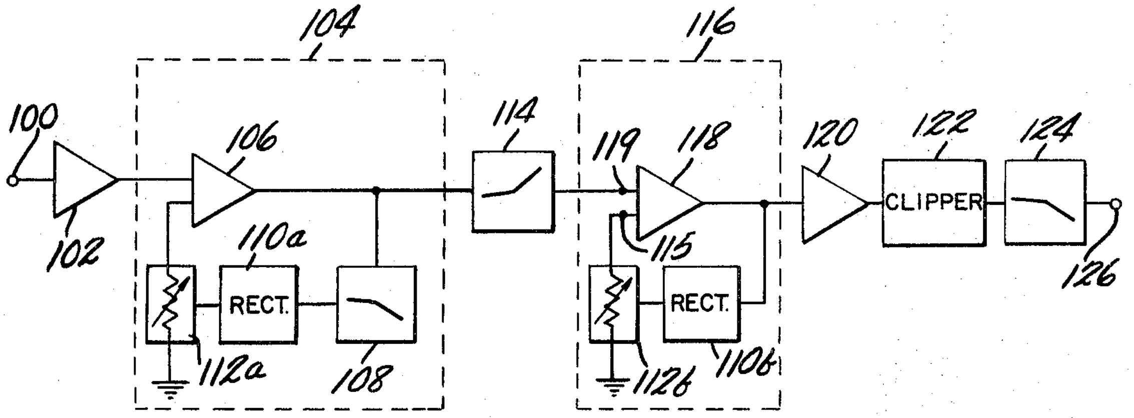
FIG. 1 is a block diagram of a frequency sensitive amplitude limiter circuit according to one embodiment of the invention.

Referring to FIG. 1, an input signal such as from a microphone, is connected via terminal 100 and amplifier 102 to a first automatic gain control circuit 104 comprised of the elements enclosed within the dotted rectangle. This circuit is arranged to vary its gain primarily in response to the low frequency components of the signal, while at the same time passing the entire signal band.

Thus limited, the signal is then fed to an equalizer 114, such as a conventional 75 microsecond preemphasis network wherein the high frequency components are accentuated. The equalized signal is then connected to a second automatic gain control circuit 116. The resultant signal is then coupled through an amplifier 120 to a clipper 122 and finally to an equalizer 124 which may be a conventional deemphasis network having a transfer function complementary to that of the equalizer 114. The signal at output terminal 126 may now be applied to the usual preemphasis network preceding the F.M. modulator.

The automatic gain control circuit 104 may be of the type disclosed in the aforementioned co-pending application, with the addition of a low pass filter in the feedback path. The circuit comprises a variable gain amplifier 106, a low pass filter 108 connected to the output of the amplifier 106, a detector or rectifier circuit **110*a* connected to the low pass filter 108 and a variable impedance circuit 112*a* whose impedance varies in accordance with the magnitude of an applied D.C. potential. The D.C. output of rectifier 110*a* is connected to the variable impedance 112*a* which is coupled to the amplifier 106 so that an increase in D.C. voltage applied thereto causes a gain decrease of amplifier 106. The filter 108 may be designed to have a break frequency equal to the break frequencies of equalizers 114 and 124. In the case of conventional F.M. preemphasis, this would be approximately 2000 c.p.s. and filter 108** would attenuate frequencies above this value.

As will be apparent, the entire signal passes through and is amplified by the variable gain amplifier 106, but the gain of amplifier 106 is controlled primarily in accordance with changes in amplitude of the low frequency signal components, because of filter 108. Rectifier **110*a* provides a direct current level to the coupling circuit 112*a*, which level is determined principally by the amplitude of the low frequency signal components, as provided by the filter 108**.

As discussed in the aforementioned co-pending application, in order to maintain signal amplitudes at the 100% modulation level, and at the same time eliminate the audible distortion which would be caused by limiting signals having peaks of relatively long durations with instantaneously recovering limiters, the attack time of the gain control loop in the circuit 104 is designed to be about 1 millisecond, while the recovery time of the circuit is set to be that of the syllabic rate of speech (i.e., about 100 milliseconds). Signal peaks having durations of less than 1 millisecond do not affect the gain of the control circuitry.

The second automatic gain control circuit 116 comprises a variable gain amplification circuit 118, a detector or rectifier circuit **110*b* connected to receive the output of amplification circuit 118, and a variable impedance coupling circuit 112*b* similar to circuit 112*a*, to which the output of rectifier 110*b* is connected and which is in turn connected to the gain control terminal 115 of the circuit 118. The signal, after equalization in circuit 114 is connected to the input terminal 119 of the amplification circuit. Rectifier 110***b* provides a direct current level which is proportional to the amplitude of the amplifier output.

Figures 1A, 2:
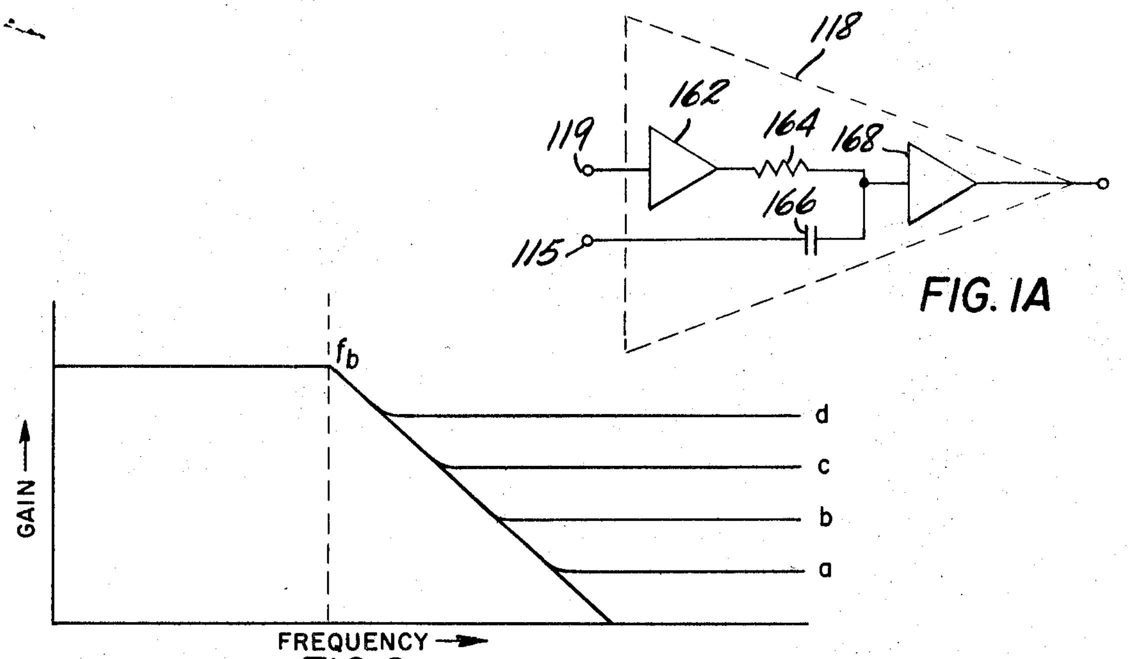
FIG. 1A is a block diagram showing a portion of the limiter of FIG. 1 in greater detail.
FIGS. 2 and 3 are curves helpful in explaining the operation of the limiter of FIG. 1.

Turning now to FIG. 1A, the amplification circuit 118 is seen to include a first amplification stage 162, a resistor 164, a capacitor 166 and a second amplification stage 168. The input signal is applied at terminal 119 and the gain control voltage to terminal 115.

The R-C network 164, 166 functions as a low pass filter at the input to amplification stage 168. For frequencies up to the knee of the preemphasis curve (i.e., approximately 2000 c.p.s.), the capacitor is effectively an open circuit and the full amplitude of the low frequency signals is applied to the input of the amplifier stage 168. The output of stage 168 in turn generates a D.C. control voltage in a rectifier 110*b*, which is applied to circuit 112*b* (FIG. 1). If, for example, all of the input signal frequencies were below 2000 c.p.s., the control voltage would have no effect on the amplifier operation.

However, with increasing frequency, the impedance of capacitor 166 decreases and the response of the circuit to high frequencies becomes dependent on the magnitude of the control voltage. The preemphasis provided by network 114 increases the relative amplitude of higher frequency signal components which in turn tends to increase the control voltage applied to circuit 112*b*, which thus presents a lower impedance at terminal 115. At the same time, capacitor 166 also presents a lower impedance to the higher frequencies, with the result that the amplitude of the higher frequency signals applied to the input to stage 168 decreases. The combined effect of the capacitor 166 and the variable impedance 112*b* is that of a variable filter which provides a different high frequency response characteristic for each different maximum signal amplitude input. The overall gain, or more precisely, the attenuation of circuit 116 is set by adjustment of amplifier stages 162, 168 and variable impedance 112*b* to be precisely equal to the maximum amount of "excess" signal amplitude, i.e., that amplitude that would cause overmodulation, resulting from preemphasis network 114.

The feedback loop comprising rectifier 110*b* and variable impedance 112*b* is designed to have the same attack time, 1 millisecond, as its counterpart in the first control circuit 104, and a recovery time significantly longer than a single cycle of any frequency in the range of operation above 2 kc., e.g. 10 milliseconds.

After the second gain control operation performed by circuit 116, the altered signals are fed through an amplifier 120 to a clipper 122. As hereinbefore mentioned, signal peaks of less than a millisecond duration are not affected by the gain control circuits 104, 116 and could cause undesirable overmodulation. To prevent this, these short duration peaks are clipped by circuit 122, such as of the type shown in the aforementioned prior application, to the maximum allowable signal level. Since the clipping circuit recovers substantially instantaneously, it can respond to closely spaced peaks. Although clipping introduces some distortion of the signal, it is imperceptible against the background of the overall improvement achieved by the preceding limiting action.

After clipping, the signal is subjected to deemphasis in circuit 124, which has a characteristic complementary to that of the preemphasis circuit 114. The signal at output terminal 126 is now in condition to be applied to the input of the utilization circuit, e.g., the preemphasis network of an F.M. transmitter.

In adjusting the arrangement limiter of FIG. 1, amplifiers 102, 162 (FIG. 1A) and 120 are respectively set to provide drives of magnitudes within the proper ranges to limiter 104, amplification stage 168 (FIG. 1A), and clipper 122.

The overall operation of the system may be explained as follows. The entire signal is amplified by amplifier 106, whose gain is controlled primarily in response to the low frequency components of the signal. The filter 108 minimizes the tendency of high amplitude signals, at frequencies above the knee of the curve (eg., 2000 c.p.s.), to reduce the gain of the amplifier. The circuit 104 thus has the effect of maintaining the low frequency signal components at an amplitude level corresponding to that required for 100% modulation.

Elements 114 and 116 serve to bring the high frequency signal components to the proper amplitude level. Since the signals will be preemphasized at the transmitter of the broadcasting system utilizing the frequency sensitive limiter shown, the network 114 is employed to anticipate the effect of the later preemphasis, so that signal levels can be properly established. As will be understood, the preemphasis network 114 increases the amplitude of the high frequency signals (above 2000) c.p.s. relative to the low frequency components, whose amplitudes are maintained essentially at a constant level. Since the low frequency components are relatively unaffected by the preemphasis, the network 114 can be located before the gain control circuit 104 without changing the operation of the system.

The preemphasized signal is now applied to the second gain control circuit 116, which, as discussed above, functions as a variable high frequency attenuation network. The low frequency signal components, which already are at a level proportional to that which will produce 100% modulation at the transmitter, suffer no attenuation in 116. The high frequency components however, are attenuated by amounts determined by the gain control voltage developed by circuit elements 110*b* and 112*b*. The gain (or, more properly, attenuation) control loop is so adjusted that the high frequency components are reduced in amplitude by amounts equal to the amounts by which the high frequency components at the output of network 114 would cause overmodulation if applied directly to the transmitter.

The signals are then applied through amplifier 120 to the clipper 122 where short duration signal peaks (i.e., less than 1 millisecond in duration) are clipped at an amplitude corresponding to the 100% modulation level. At this point, the entire signal is at a level which would provide essentially 100% modulation without overmodulation, if applied directly to the frequency modulator without the conventional preemphasis.

To adapt the circuit for use with existing F.M. transmission equipment which conventionally includes a preemphasis network as an integral part, the deemphasis network 124 is provided. This circuit, whose characteristic is complementary to the preemphasis characteristic, restores low level signals to their original spectral relationship, so that when subsequently applied to the preemphasis network in the F.M. transmitter, the final modulating signal will provide 100% modulation without overmodulation.

The deemphasis network also minimizes the effect of higher order distortion components which may be created by the clipping process.

The response of the second automatic gain control circuit 116 is shown in FIG. 2. For frequencies below the break frequency, the gain of the circuit is unaffected and remains constant at some preset maximum level. The overall gain of the circuit begins to fall off after the break frequency $f_b$ at a rate determined by the characteristic of the variable impedance 112*b*. Higher amplitude high frequency components will be attenuated more than lower amplitudes, as shown by the horizontal lines *a* to *d*, which represent steady state conditions. Thus, a very high amplitude component will suffer attenuation in accordance with the characteristic $f_b$–*a*. Smaller amplitude signals will result in correspondingly less attenuation, as indicated by lines $f_b$–*b* to $f_b$–*d*.

The overall steady state response of the circuit of FIG.

Figure 3:
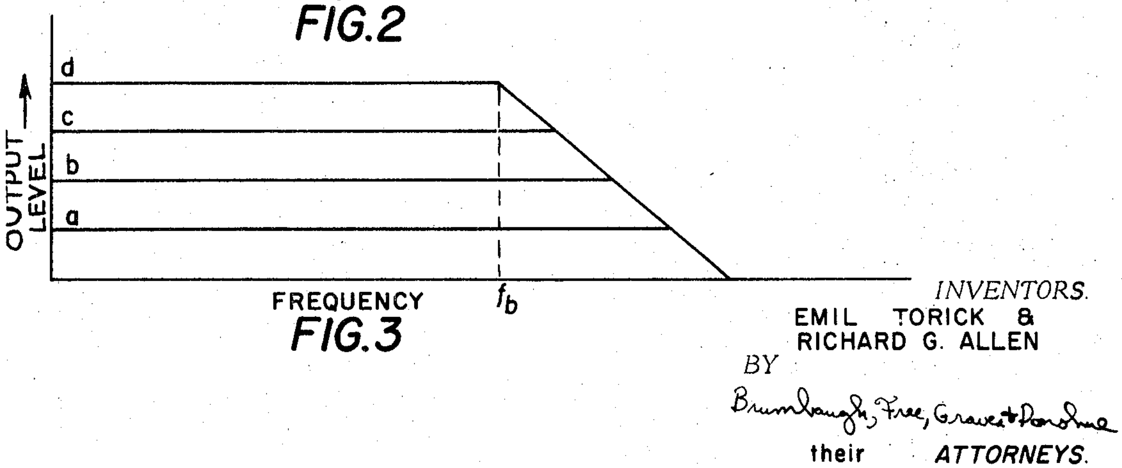

1 is illustrated in FIG. 3. The gain of the system remains constant over the low frequency range, at a value dependent upon input amplitude, line *a* representing a low amplitude input and lines *b, c,* and *d* successively higher amplitude inputs. The output level then falls off in accordance with the deemphasis characteristic.

Figure 4:
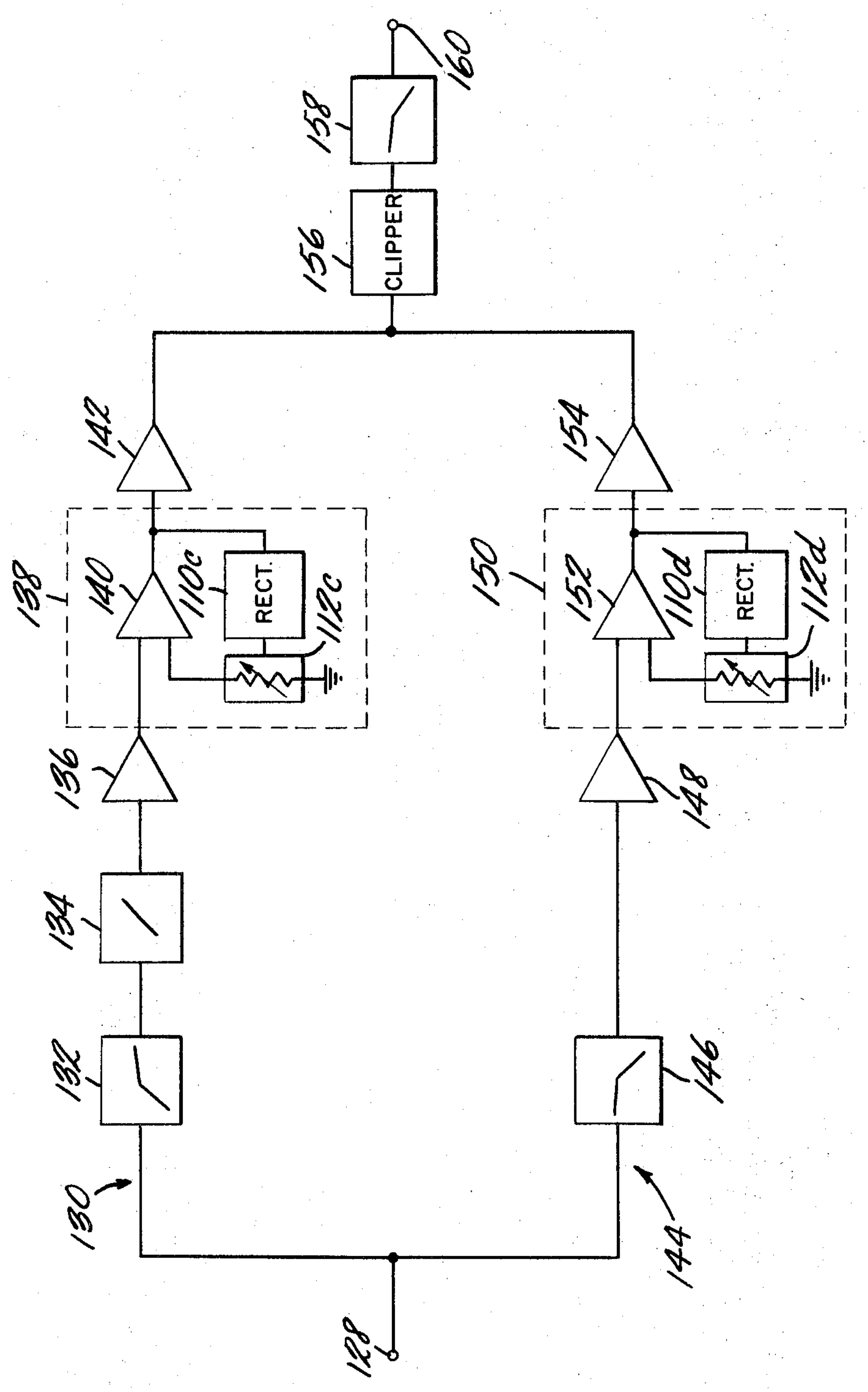
FIG. 4 is a block diagram of another embodiment of the invention.

In another embodiment of the invention, shown in FIG. 4, the low and high frequency gain control functions are performed in parallel, rather than successively, as in FIG. 1. The high frequency channel 130 is comprised of a high pass filter 132, an equalizer 134, such as a preemphasis network, and an automatic gain control circuit 138 similar to circuit 116 (FIG. 1) or to circuit 104 without the low pass filter 108. The low frequency channel 144 is comprised of a low pass filter 146, and an automatic gain control circuit 150, similar to circuit 104 without the low pass filter 108.

The high and low pass filters, 132 and 146, respectively, have break points, in the F.M. transmission system, of approximately 2000 c.p.s. and serve to restrict the frequency bands of the signals in each of the channels. From the high pass filter, the high frequency signal components pass through an equalizer 134, e.g., a conventional preemphasis network, which modifies the signal amplitudes in accordance with its characteristic, emphasizing the higher frequency components. Similarly, they are then fed to the automatic gain control circuit 138, through amplifier 136, and maintained at the proper levels to insure 100% modulation without overmodulation. The low frequency signal components, from the low pass filter 146, are maintained at the desired amplitude levels by the circuit 150.

After limiting, the low and high frequency components of the signal are amplified by amplifiers 154 and 142, respectively, and then combined. Short duration peaks are then removed by clipper 156. Finally, the combined signal passes through an equalizer 158 which has a transfer function complementary to that of the equalizer 134. The overall characteristic of the circuit is similar to that of the embodiment of FIG. 1, as shown in FIG. 3. The resultant signal at terminal 160, when applied to an F.M. transmitter in which it will undergo preemphasis, will allow substantially 100% modulation to be achieved, without overmodulation.

Although the invention has been described above as used in an F.M. transmitting system, it will be realized that the principles upon which it is based are capable of much wider application. The techniques and apparatus described hereinabove can be readily adapted for use in any signal transmission system where the maximum desired signal output characteristic is not constant with frequency.

The arrangements of FIGS. 1 and 4 need only be modified with respect to their filter and equalizer characteristics to accommodate a utilization circuit other than an F.M. transmitter with preemphasis. Thus, the basic elements of the invention, i.e. (1) equalizing the signal in a network having an amplitude characteristic which is the inverse of the desired output amplitude characteristic, (2) controlling the gain and limiting the signal in accordance with its frequency, and (3) restoring, in a complementary equalizer, the low level response, are of general application.

It will be understood that if the broadcasting equipment does not include the usual preemphasis network, the deemphasis network of the frequency sensitive limiter described above may be eliminated. Similarly, other variations in the techniques and apparatus described herein are possible without departing from the spirit and scope of the invention. For example, although the structure of the automatic gain control feedback elements preferably are of the type shown in the aforementioned co-pending application, other forms of rectifier and variable impedance circuits may occur to those skilled in the art. It is therefore desired that the present invention be limited only by the scope of the appended claims.

We claim:

1. An audio frequency signal limiting arrangement for limiting the amplitude of a signal in accordance with the anticipated preemphasis of the signal by a frequency modulation system comprising, a first amplifier the gain of which is controlled in response to the amplitude of signals below a predetermined frequency in the audio range, means coupled to said first amplifier to preemphasize frequency components of the signal above said predetermined frequency relative to components below said predetermined frequency in accordance with the anticipated preemphasis of the signal by the frequency modulation system, a second amplifier coupled to said preemphasis means the gain of which decreases with increasing frequency above said predetermined frequency, and means coupled to the output of said second amplifier to deemphasize frequency components above said predetermined frequency in accordance with a characteristic complementary to that of said preemphasis means.

2. A signal limiting arrangement according to claim 1 wherein signal peaks of less than a predetermined duration are not effective to vary the gain of said amplifiers and wherein there is further provided clipper means between said second amplifier and said deemphasis means for limiting signal peaks of less than said predetermined duration to a preselected amplitude.

3. A signal limiting arrangement according to claim 2 wherein said first amplifier includes input and output terminals and a feedback loop comprising a low pass filter connected to said output terminal, a rectifier responsive to the output of said filter and a variable impedance coupling the rectifier output to the input terminal of said amplifier.

4. A signal limiting arrangement according to claim 2 wherein said second amplifier includes input and output terminals and a feedback loop comprising a rectifier coupled to said output terminal, a variable impedance coupled to the output of said rectifier, and a low pass filter coupling said variable impedance to said input terminal, the high frequency attenuation of said filter being dependent upon the D.C. potential provided by said rectifier to said variable impedance.

5. A signal limiting arrangement according to claim 4 wherein said preemphasis means is connected to the output of said first amplifier.

6. An audio frequency signal limiting arrangement for limiting the modulation of a signal in accordance with the anticipated preemphasis of the signal by a frequency modulation system comprising, a first amplifier means having a variable gain which is varied in response to the amplitude of components of the signal below a predetermined frequency in the audio range, said variation of the gain of said first amplifier means not occurring in response to signal peaks of less than a predetermined duration, means coupled to the first amplifier means for preemphasizing components of the signal above said predetermined frequency relative to components below said predetermined frequency in accordance with the anticipated preemphasis of the signal by the frequency modulation system, a second amplifier means the gain of which decreases with increasing frequency above said predetermined frequency and is not variable in response to signal peaks of less than a predetermined duration, the second amplifier means being connected to receive the signal amplified by the first amplifier means, means coupled to the output of the second amplifier means for deemphasizing components of the signal above said predetermined frequency in accordance with a characteristic complementary to that of said preemphasis means, and a clipper means connected between the second amplifier means and the deemphasis means for limiting signals have a duration not exceeding the predetermined duration necessary to vary the gains of the first and second amplifier means.

7. The arrangement according to claim 6 wherein said means for preemphasizing is connected to the output of said first amplifier means.

References Cited

UNITED STATES PATENTS

| | | | |
|---|---|---|---|
| 3,109,991 | 11/1963 | Ocko | 325—46 |
| 3,111,635 | 11/1963 | Skov et al. | 325—46 |
| 3,193,681 | 7/1965 | Schwarz | 325—46 |
| 2,358,045 | 9/1944 | Barney | 333—18 |

ROBERT L. GRIFFIN, Primary Examiner

A. J. MAYER, Assistant Examiner

U.S. Cl. X.R.

325—147, 148